United States Patent [19]

Hsu et al.

[11] Patent Number: 5,359,016
[45] Date of Patent: * Oct. 25, 1994

[54] PROCESS FOR THE SYNTHESIS OF STYRENE-ISOPRENE RUBBER

[75] Inventors: Wen-Liang Hsu, Copley; Adel F. Halasa, Bath; Barry A. Matrana, Akron, all of Ohio

[73] Assignee: The Goodyear Tire & Rubber Company, Akron, Ohio

[*] Notice: The portion of the term of this patent subsequent to Jul. 27, 2010 has been disclaimed.

[21] Appl. No.: 37,835

[22] Filed: Mar. 29, 1993

[51] Int. Cl.$^5$ .......................... C08F 2/06; C08F 4/48; C08F 236/10
[52] U.S. Cl. ................................ 526/181; 526/173; 526/204; 526/340
[58] Field of Search ............... 526/181, 204, 340, 173

[56] References Cited

U.S. PATENT DOCUMENTS

| | | |
|---|---|---|
| 3,847,883 | 11/1974 | Kamienski et al. ............... 260/83.7 |
| 4,367,325 | 1/1983 | Takeuchi et al. .................. 526/340 |
| 4,429,091 | 1/1984 | Hall ..................................... 526/181 |
| 4,696,986 | 9/1987 | Halasa et al. ....................... 526/181 |
| 5,137,998 | 8/1992 | Hsu et al. ............................ 526/174 |
| 5,173,550 | 12/1992 | Hsu et al. ............................ 526/180 |
| 5,231,153 | 7/1993 | Hsu et al. ............................ 526/181 |

OTHER PUBLICATIONS

Hackh's Chemical Dictionary (4th ed.) McGraw-Hill Ca, N.Y., 286 (1969).
United States Patent Application Ser. No. 07/864,264, filed Apr. 6, 1992 of Wen-Liang Hsu, Adel Farhan Halasa and Barry Allen Matrana for Anionic Polymerization Modifier, pending in Art Unit 1505.

*Primary Examiner*—Fred Teskin
*Attorney, Agent, or Firm*—Alvin T. Rockhill

[57] ABSTRACT

The subject invention relates to a technique for synthesizing rubbery copolymers of styrene and isoprene. These rubbery copolymers exhibit an excellent combination of properties for utilization in tire tread rubber compounds. By utilizing these styrene-isoprene rubbers in tire treads, tires having improved wet skid resistance can be built without sacrificing rolling resistance or tread wear characteristics. This invention more specifically discloses a process for the synthesis of styrene-isoprene rubbers which comprises copolymerizing isoprene monomer and styrene monomer in an organic solvent in the presence of a catalyst system which is comprised of (a) a lithium initiator and (b) an alkyl tetrahydrofurfuryl ether modifier, wherein the molar ratio of the modifier to the lithium initiator is within the range of 2:1 to 40:1. The subject invention further discloses a process for the synthesis of styrene-isoprene rubbers which comprises copolymerizing isoprene monomer and styrene monomer in an organic solvent in the presence of a catalyst system which is comprised of (a) a lithium initiator and (b) 2,2-ditetrahydrofurylpropane as a modifier, wherein the molar ratio of the modifier to the lithium initiator is within the range of 1:1 to 40:1.

12 Claims, No Drawings

PROCESS FOR THE SYNTHESIS OF STYRENE-ISOPRENE RUBBER

BACKGROUND OF THE INVENTION

It is highly desirable for tires to have good wet skid resistance, low rolling resistance, and good wear characteristics- It has traditionally been very difficult to improve a tire's rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For example, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature-which is within the range of about −50° C. to 0° C. According to U.S. Pat. No. 4,843,120 these polymers are made by polymerizing at lease one conjugated diolefin in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally initiated with an organolithium initiator and are generally carried out in an inert organic solvent.

U.S. Pat. No. 5,137,998 discloses that terpolymers of styrene, isoprene, and butadiene which exhibit multiple viscoelastic responses result from terpolymerizations of styfete, isoprene, and 1,3-butadiene in the presence of an alkali metal alkoxide and an organolithium initiator. By utilizing this technique, such terpolymers which exhibit multiple glass transition temperatures can be prepared in a single reaction zone. The SIBR (styrene-isoprene-butadiene rubber) made by the technique of U.S. Pat. No. 5,137,998 offers an outstanding combination of properties for utilization in making tire tread rubber compounds. For example, utilizing such SIBR in tire tread compounds results in improved wet skid resistance without sacrificing rolling resistance or tread wear characteristics.

It is known in the art that 3,4-polyisoprene can be used in tire tread compounds to improve tire performance characteristics, such as traction. Polar modifiers are con, hotly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylarnine, triethylamine, N,N,N',N'-tetramethylethylenediamine, N-methyl morpholine, N-ethyl morpholine, and N-phenyl morpholine can be used as modifiers.

U.S. Pat. No. 4,696,986 describes the use of 1,2,3-trialkoxybenzenes and 1,2,4-trialkoxybenzenes as modifiers. The vinyl group content of polydienes prepared utilizing Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints; Vol. 7 (1), 132[1966]. For this reason it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. However, it has traditionally been difficult to prepare polymers having high vinyl contents at temperatures which are high enough to attain maximum polymerization rates while utilizing conventional Lewis bases as modifiers.

U.S. Pat. No. 5,231,153 reports that compounds having the following structural formulae can be used as modifiers in the synthesis of polydienes:

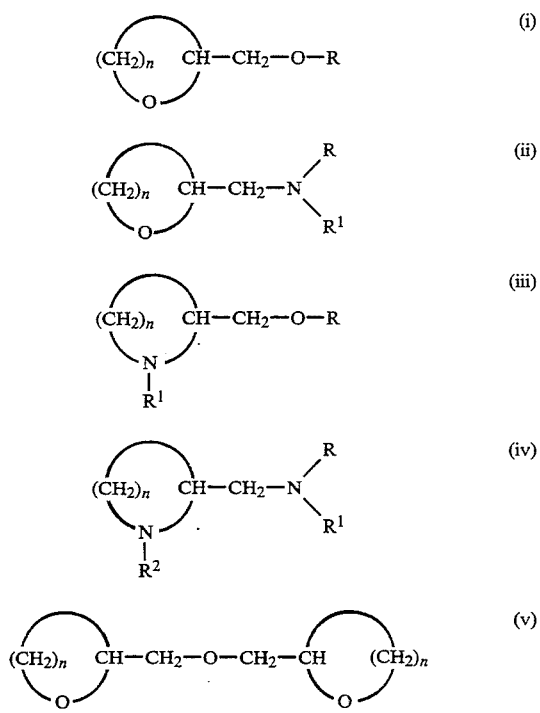

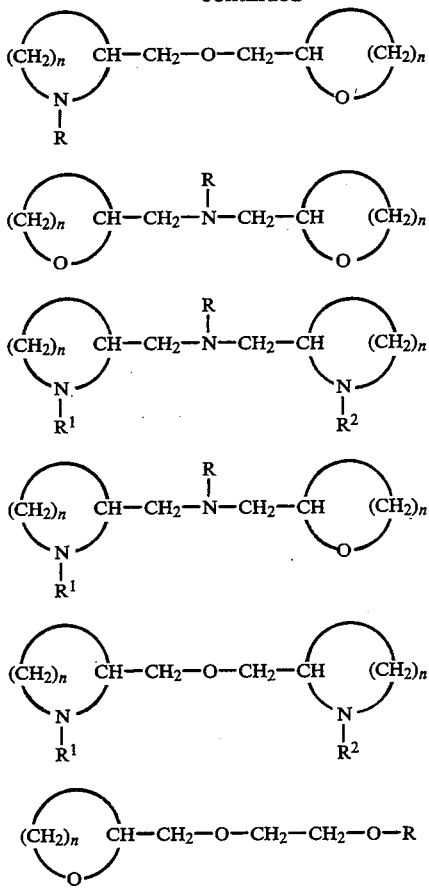

wherein n represents an integer within the range of 3 to 6, and wherein R, $R^1$, and $R^2$ can be the same or different and represent alkyl groups containing from 1 to 10 carbon atoms, aryl groups containing from 6 to 10 carbon atoms, or hydrogen atoms.

U.S. Pat. No. 5,231,153 further reports that these modifiers remain stable at conventional polymerization temperatures and lead to the formation of polymers having high vinyl contents at such temperatures. Accordingly, they can be used to promote the formation of high vinyl polymers at temperatures which are high enough to promote very fast polymerization rates.

SUMMARY OF THE INVENTION

It has been unexpectedly found that rubbery copolymers of styrene and isoprene which exhibit dual glass transition temperatures can be synthesized utilizing lithium initiators and an alkyl tetrahydrofurfuryl ether modifier when the molar ratio of modifier to the lithiu/n initiator is within the range of 2:1 to 40:1. It has further been unexpectedly found that 2,2-ditetrahydrofurylpropane can be used as the modifier to produce styrene-isoprene rubbers having dual glass transition temperatures at molar ratios of the modifier to the lithium initiator of greater than 1:1. By utilizing this technique, such copolymers which exhibit multiple glass transition temperatures can be prepared in a single reaction zone. The styrene-isoprene rubber made by the technique of this invention offers an outstanding combination of properties for utilization in making tire tread rubber compounds. For example, utilizing such styrene-isoprene rubber having dual glass transition temperatures in tire tread compounds results in improved wet skid resistance without sacrificing rolling resistance or tread wear characteristics.

Utilizing the technique of this invention, styrene-isoprene rubber which exhibits multiple viscoelastic response can be easily prepared on a commercial basis in a single reaction zone. In other words, this invention eliminates the need for utilization of two or more polymerization reactors for preparing styrene-isoprene rubber which exhibits multiple glass transition temperatures.

The subject invention more specifically discloses a process for the synthesis of styrene-isoprene rubbers which comprises copolymerizing isoprene monomer and styrene monomer in an organic solvent in the presence of a catalyst system which is comprised of (a) a lithium initiator and (b) an alkyl tetrahydrofurfuryl ether modifier, wherein the molar ratio of the modifier to the lithium initiator is within the range of 2:1 to 40:1.

DETAILED DESCRIPTION OF THE INVENTION

The relative amount of isoprene and styrene employed can vary over a wide range. In preparing rubbery polymers, the proportion of the isoprene versus the styrene should be sufficient so as to result in a substantially rubbery or elastomeric copolymer product. There is no sharp break point as to the amount of isoprene versus styrene that confers rubbery or elastomeric properties on the resulting copolymer, though in general at least 50 parts by weight of isoprene are required on an exemplary basis. Thus, for a rubbery copolymer, as is preferred in accordance with this invention, the weight ratio of isoprene to styrene in the monomer charge would be in the range of about 50:50 to 95:5. In most cases the monomer charge composition will contain from about 10 weight percent to about 40 weight percent styrene and from about 60 weight percent to 90 weight percent isoprene. It is normally preferred for the monomer charge composition to contain from about 15 weight percent to about 25 weight percent styrene and from about 75 weight percent to about 85 weight percent isoprene.

The polymerizations of the present invention which are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentate, isooctane, cyclohexane, normal hexane, benzene, toluene, xylene, ethylbenzene, and the like, alone or in admixture. The modifiers of this invention are also useful in bulk polymerizations which are initiated with lithium catalyst systems.

In solution polymerizations which utilize the modifiers of this invention, there will normally be from 5 to 35 weight percent monomers in the polymerization medium. Such polymerization mediums are, of course, comprised of an organic solvent, monomers, an organolithium initiator, and the modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithiun, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compounded with a conjugated diene or monovinyl aromatic compound additive and then adding the multivinyl aromatic compound. Any of the conjugated diehes or monovinyl aromatic compounds described can be employed- The ratio of conjugated diene or monovinyl aronktic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4-trivinylbiphenyl, m-diisopropenyl benzene, p-diisopropyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a second tert-organomonolithium compounded with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R (Li)$_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithiun, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The modifiers which can be employed in the synthesis of styrene-isoprene rubbers having dual glass transition temperatures in accordance with this invention include 2,2-ditetrahydrofurylpropane (DTP) and compounds which have the structural formula:

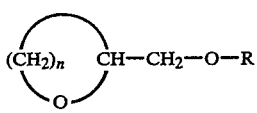

n represents an integer within the range of 3 to 6, and wherein R represents alkyl groups containing from 1 to 10 carbon atoms.

As a general rule, n will represent the integer 3 or 4. More commonly n will represent the integer 3. The most preferred types of modifier are alkyl tetrahydrofurfuryl ethers such as methyltetrahydrofurfuryl ether, ethyltetrahydrofurfuryl ether, propyltetrahydrofurfuryl ether, and butyltetrahydrofurfuryl ether.

The modifier being utilized can be introduced into the polymerization zone being utilized in any manner. In one embodiment, it can be reacted with the organometallic compound with the reaction mixture therefrom being introduced into the polymerization zone as the initiator. In another embodiment, the modifier can be introduced into the polymerization zone directly without first being reacted with the organometallic compound being utilized as the initiator. In other words, the modifiers can be introduced into the polymerization zone in the form of a reaction mixture with the organometallic initiator or they can be introduced into the polymerization zone separately.

The amount of modifier needed will vary with the vinyl content which is desired for the styrene-isoprene rubber being synthesized. However, in cases where an alkyl tetrahydrofurfuryl ether is utilized as the modifier at least 2 moles of the modifier per mole of lithiu/n in the initiator will be utilized. If polymers having very high vinyl contents are desired, then large quantities of the modifier can be used. However, normally there will be no reason to employ more than about 40 moles of the modifier per mole of lithium in the organometallic initiator system employed. In most cases from about 2 to about 15 moles of the alkyl tetrahydrofurfuryl ether modifier will be employed per mole of lithium metal in the organometallic initiator system utilized. Preferably from about 2 to 10 moles of the alkyl tetrahydrofurfuryl ether modifier will be utilized per mole of lithium with from about 2 to 5 moles of the alkyl tetrahydrofurfuryl ether modifier per mole of lithium being most preferred.

In cases where DTP is utilized as the modifier a molar ratio of DTP to the lithium in the initiator of at least 1:1 will be utilized. In most cases from about 2 to about 15 moles of the DTP modifier will be employed per mole of lithium metal in the organometallic initiator system utilized. Preferably from about 2 to 10 moles of the DTP modifier will be utilized per mole of lithium with from about 2 to 5 moles of the DTP modifier per mole of lithium being most preferred.

The polymerization temperature utilized can vary over a broad range of from about −20° C. to about 150° C. In most cases a temperature within the range of about 30° C. to about 125° C. will be utilized. Temperatures within the range of about 50° C. to about 90° C. are generally the most preferred polymerization temperatures. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxides can be used, those which are preferred are liquid since they are more readily handled and form a relatively nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tenraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1- ariridinyl)phosphine oxide, tri(2-methyl -1-ariridinyl)phosphine oxide, tri ( 2- ethyl - 3- decyl - 1- ariridinyl ) phosphine sulfide, and the like.

The multialdehydes are represented by compounds such as 1,4,7-naphthalene tricarbox-yaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered an optimum amount for maximum branching, if this result is desired in the production line. The coupling agent can be added in hydrocarbon solution, e.g., in cyclohexane, to the polymerization admixture in the final reactor with suitable mixing for distribution and reaction.

Styrene-isoprene rubbers which are made by utilizing the techniques of this invention in solution polymerizations can be recovered utilizing conventional techniques. In many cases it will be desirable to destroy residual carbon-lithiumbonds which may be present in the polymer solution and to recover the synthetic styrene-isoprene rubber produced. It may also be desirable to add additional antioxidants to the polymer solution in order to further protect the polydiene produced from potentially deleterious effects of contact with oxygen. The styrene-isoprene rubber made can be precipitated from the polymer solution and any lithium moleties can be inactivated by the addition of lower alcohols, such as isopropyl alcohol, to the polymer solution. The styrene-isoprene rubber can be recovered from the solvent and residue by means such as decantation, filtration, centrification, and the like. Steam stripping can also be utilized in order to remove volatile organic compounds from the rubber.

This invention is illustrated by the following examples which are merely for the purpose of illustration and are not to be regarded as limiting the scope of the invention or the manner in which it can be practiced. Unless specifically indicated otherwise, parts and percentages are given by weight.

Example 1

In this experiment a styrene-isoprene rubber having dual glass transition temperatures was synthesized by the technique of this invention using methyl tetrahydrofurfuryl ether (MTE) as the modifier. In the procedure used 1,810 grams of a silica/molecular sieve/aluminum dried premix containing a 19.6 percent 20%/80% styrene/isoprene mixture in hexane was charged into a one gallon (3.8 liters) reactor. After the impurity of the premix was removed by a n-butyl lithium solution, 3.47 ml (milliliters) of a 1.02M solution of MTE (in hexane) and 1.17 ml of a 1.01M n-butyl lithium solution (in hexane) was added to the reactor. The polymerization was allowed to proceed at 70° C. for 2 hours. An analysis of the residual monomers indicated that the polymerization was complete after the 2 hours of polymerization time. Then, 1 ml of ethanol was added to the reactor to shortstop the polymerization and the polymer was removed from the reactor and stabilized with 1 phr (parts per 100 parts by weight of rubber) of antioxidant.

After the hexane solvent was evaporated the resulting styrene-isoprene rubber was dried in a vacuum oven at 50° C. The styrene-isoprene rubber produced was determined to have dual gloss transition temperatures at −10° C. and 2° C. It was also determined to have a microstructure which contained 47% 3,4polyisoprene units, 29% 1,4-polyisoprene units, 4% 1,2-polyisoprene units, and 20% random polystyrene units. The Mooney viscosity of the styrene-isoprene rubber made was determined to be 85.

Examples 2-5

The procedure described in Example 1 was utilized in these experiments except that the MTE/n-BuLi ratios were changed from 3:1 to 2:1 and 5:1, respectively. The glass transition temperatures and microstructures of the resulting styrene-isoprene rubbers are listed in Table I. The styrene-isoprene rubber made in Example 2 had a Mooney viscosity of 81 and the polymer made in Example 3 had a Mooney viscosity of 85.

TABLE I

| Styrene-Isoprene Rubbers Prepared Via MTE/n-BuLi | | | | | | |
|---|---|---|---|---|---|---|
| Example No. | MTE/n-BuLi Ratio | 1st Tg | 2nd Tg | Microstructure | | |
| | | | | 1,4-PI | 3,4-PI | 1,2-PI |
| 1 | 3.0 | −10° C. | 2° C. | 29% | 47% | 5% |
| 2 | 2.0 | −15° C. | −4° C. | 33% | 37% | 5% |
| 3 | 5.0 | −7° C. | 8° C. | 40% | 34% | 5% |

Comparative Examples 4-6

The procedure described in Example 1 was utilized in these examples except that the bTTE/n-Butyl lithium molar ratio was changed from 3:1 to 0.5:1, 0.75:1, and 1:1. Under these conditions, the resulting styrene-isoprene rubbers exhibited only one glass transition temperature. The glass transition temperature and microstructure of each of the styrene-isoprene rubbers made in this series of experiments is shown in Table II.

Comparative Example 7

The procedure described in Example 1 was utilized in these examples except that the molar ratio of MTE to lithium was changed from 3:1 to 0.75:1 and the ratio of styrene to isoprene in the premix was changed from 20:80 to 50:50. The styrene-isoprene rubbers made in these comparative experiments were determined to have only one glass transition temperature. The glass transition temperatures and microstructures of the polymers synthesized in these experiments are shown in Table II.

TABLE II

Styrene-Isoprene Rubbers Prepared Via MTE/n-BuLi

| Example No. | MTE/n-BuLi Ratio | sty | Tg (°C.) | Microstructure | | |
|---|---|---|---|---|---|---|
| | | | | 1,4-PI | 3,4-PI | 1,2-PI |
| 4 | 0.5 | 19% | −36 | 61% | 20% | 0% |
| 5 | 0.75 | 24% | −26 | 55% | 18% | 3% |
| 6 | 1.0 | 22% | −21 | 44% | 29% | 5% |
| 7 | 0.75 | 50% | 5 | 35% | 15% | 0% |

Examples 8–11

The procedure described in Example 1 was utilized in these examples except that DTP was used as the modifier. The glass transition temperatures of the styrene-isoprene rubbers produced along with the DTP/n-BuLi ratios utilized are tabulated in Table III. The molar ratio of DTP to n-butyl lithium used in this series of experiments was 1:1, 1.5:1, 2:1, and 4:1. At these ratios of DTP modifier to lithium styrene-isoprene rubbers having dual glass transition temperatures resulted. The glass transition temperatures of the polymers made and their microstructures are reported in Table III.

TABLE III

Styrene-Isoprene Rubbers Prepared Via DTP/n-BuLi

| Example No. | DTP/n-BuLi Ratio | 1st Tg (°C.) | 2nd Tg (°C.) | Microstructure | | |
|---|---|---|---|---|---|---|
| | | | | 1,4-PI | 3,4-PI | 1,2-PI |
| 8 | 1.0 | −19 | −7 | 43% | 35% | 3% |
| 9 | 1.5 | −9 | 6 | 40% | 36% | 5% |
| 10 | 2.0 | −2 | 8 | 35% | 41% | 5% |
| 11 | 4.0 | 4 | 17 | 20% | 52% | 8% |

Comparative Examples 12–14

The procedure described in Example 1 was utilized in these examples except that DTP was used as the modifier at a molar ratio of DTP to n-butyl lithium of less than 1:1. The styrene-isoprene rubbers produced in this series of experiments had only one glass transition temperature. The glass transition temperatures of the polyphers made and their microstructure are shown in Table IV.

TABLE IV

Styrene-Isoprene Rubbers Prepared Via DTP/n-BuLi

| Example No. | DTP/n-BuLi Ratio | Tg (°C.) | sty | Microstructure | | |
|---|---|---|---|---|---|---|
| | | | | 1,4-PI | 3,4-PI | 1,2-PI |
| 12 | 0.25 | −54 | 21% | 73% | 6% | 0% |
| 13 | 0.50 | −44 | 20% | 66% | 14% | 0% |
| 14 | 0.75 | −25 | 18% | 62% | 18% | 2% |

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of styrene-isoprene rubbers which comprises copolymerizing isoprene monomer and styrene monomer in an organic solvent in the presence of a catalyst system which is comprised of (a) a lithium initiator and (b) a modifier having the structural formula:

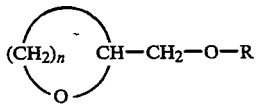

wherein n represents an integer within the range of 3 to 6, and wherein R represents an alkyl group containing from 1 to 10 carbon atoms, wherein the molar ratio of the modifier to the lithium initiator is within the range of 2:1 to 40:1.

2. A process as specified in claim 1 wherein the modifier is an alkyl tetrahydrofurfuryl ether selected from the group consisting of methyl tetrahydrofurfuryl ether, ethyl tetrahydrofurfuryl ether, propyl tetrahydrofurfuryl ether, and butyl tetrahydrofurfuryl ether.

3. A process as specified in claim 2 wherein the initiator is an alkyl lithium compound.

4. A process as specified in claim 3 wherein the initiator is n-butyl lithium.

5. A process as specified in claim 3 wherein the molar ratio of the modifier to lithium in the lithium initiator is within the range of 2:1 to about 15:1.

6. A process as specified in claim 3 wherein the molar ratio of the modifier to lithium in the lithium initiator is within the range of about 2:1 to about 10:1.

7. A process as specified in claim 3 wherein the molar ratio of the modifier to lithium in the lithium catalyst is within the range of about 2:1 to about 5:1.

8. A process as specified in claim 5 wherein said polymerization is carried out at a temperature which is within the range of about 30° C. to about 125° C.

9. A process as specified in claim 8 wherein from about 0.01 phm to about 0.1 phm of the organolithium initiator is present.

10. A process as specified in claim 9 wherein the modifier is methyl tetrahydrofurfuryl ether.

11. A process as specified in claim 8 wherein the monomer charge polymerized contains from about 60 weight percent to about 90 weight percent isoprene and from about 10 weight percent to about 40 weight percent styrene.

12. A process as specified in claim 8 wherein the monomer charge polymerized contains from about 75 weight percent to about 85 weight percent isoprene and from about 15 weight percent to about 25 weight percent styrene.

* * * * *